United States Patent [19]
Begum et al.

[11] Patent Number: 5,420,606
[45] Date of Patent: May 30, 1995

[54] INSTANT ELECTRONIC COUPON VERIFICATION SYSTEM

[76] Inventors: Paul G. Begum, 2608 Nottingham Way, Salt Lake City, Utah 84108; Mark A. Geiger, 871 Canyon Ridge Way #31, Midvale, both of Utah 84047

[21] Appl. No.: 123,192
[22] Filed: Sep. 20, 1993
[51] Int. Cl.⁶ .............................................. G09G 3/02
[52] U.S. Cl. .................... 345/156; 235/382.5
[58] Field of Search .............. 345/156; 340/825.35, 340/825.54, 825.55, 825.69, 825.72; 235/435, 381, 382.5

[56] References Cited
U.S. PATENT DOCUMENTS

| | | | |
|---|---|---|---|
| 3,836,755 | 9/1974 | Ehrat | 340/825.35 X |
| 4,002,886 | 1/1977 | Sundelin | 340/825.35 X |
| 4,071,740 | 1/1978 | Gogulski | 235/431 |
| 4,500,880 | 2/1985 | Gomersall et al. | 340/825.35 |
| 4,882,675 | 11/1989 | Nichtberger et al. | 364/401 |
| 4,882,724 | 11/1989 | Vela et al. | 364/401 |
| 4,888,709 | 12/1989 | Revesz et al. | 340/825.35 X |
| 4,937,586 | 6/1990 | Stevens et al. | 340/825.35 X |
| 4,973,952 | 11/1990 | Malec et al. | 340/825.35 |
| 5,111,196 | 5/1992 | Hunt | 340/825.35 |
| 5,272,321 | 12/1993 | Otsuka et al. | 235/381 |

Primary Examiner—Ulysses Weldon
Attorney, Agent, or Firm—Bielen, Peterson & Lampe

[57] ABSTRACT

An electronic paperless couponing system in which a store provides shoppers with an electronic communications device having a display screen for display of a graphic of a redemption coupon that represents a discount for an item in the store available for purchase. The communication device has a selection button to enter the selection of the coupon indicating the user's desire to redeem the coupon and a memory to record the selection until the shopper reaches the checkout counter and deducted from the purchases when it is determined that the item subject to the discount has been purchased.

11 Claims, 3 Drawing Sheets

INSTANT ELECTRONIC COUPON VERIFICATION SYSTEM

BACKGROUND OF THE INVENTION

This invention relates to an electronic paperless couponing system that allows an in-store, electronic coupon to be issued and redeemed without the necessity of putting the coupon on paper or other tangible medium. In the marketplace, the redemption coupon has become a popular means of both advertising a product and providing the consumer with a financial benefit. The redemption coupon customarily allows the holder of the coupon to receive a special savings on one or more products that is not available to other shoppers who do not possess the coupon. The coupon upon redemption provides a means for tracking customer tastes and reactions. Information can be correlated with other marketing data to develop a customer profile for intelligent analysis of product promotions.

Unfortunately, because redemption coupons frequently have a cash redemption, the conventional system is subject to abuse. Redemption coupons can be submitted in large numbers to the product manufacturer by unscrupulous retailers without the product having ever been purchased. Because of the difficulty in correlating the number of available redemption coupons with the specialty items sold, the conventional system is subject to manipulation. It would be extremely desirable to a product manufacturer, if a redemption coupon presented to a potential purchaser was directly correlated with the purchase of an item that is the subject of the coupon. It would be even more desirable if it were possible to assure that the purchaser inspected the coupon and the exercise of the coupon resulted in a direct savings to the shopper. In this manner, each time that the redemption coupon is exercised by the consumer, the manufacturer is assured that an exercised coupon for a specific product is directly related to the identical product being purchased by that customer. Such a system would eliminate the potential for abuse and permit redemption of only those coupons that are actually exercised by a consumer and resulted in a savings to that shopper upon purchase of the specified item. Additionally, an electronic system that provides both for the display of the electronic coupon and the electronic issuance and redemption of such coupon can wholly avoid the necessity for printing and publishing coupons in material form and the attendant expense of such printing and distribution.

In its preferred form, the electronic coupon system is incorporated into a portable shopper's display system that in turn is coordinated with an in-store electronic marketing system, preferably of the type disclosed in U.S. patent application entitled Automated Shopping Cart Handle, U.S. Ser. No. 08/090,285, filed Jul. 12, 1993.

The electronic paperless couponing system of this invention can be combined with the point of purchase promotional system described in the referenced patent application, or, can be an independent system designed exclusively to provide electronic coupons to prospective purchasers. In its preferred embodiment the couponing system utilizes standard bar code data and product identification numbers to coordinate the coupon issuance with the product sales accounting using existing store or manufacturer accounting systems in conjunction with the systems computer that issues, records and redeems the discount coupons in the electronic paperless couponing system of this invention.

SUMMARY OF THE INVENTION

The electronic paperless couponing system of this invention is an electronic in-store coupon issuing and redeeming system that avoids the necessity of printing and collecting paper coupons. The advantage of the system is that a coupon displayed to a prospective purchaser is actively selected by the purchaser and the selection is correlated with the actual purchase of the item that is subject to a coupon discount by that purchaser. The coupon selection and item purchased are recorded to provide an audit trail to insure that the promotion for the discounted item was reviewed by the shopper and that the subject item to the discount was, in fact, purchased by that shopper.

The system operates with the use of an electronic display device in the form of a communication unit. The communication unit has a display screen to electronically display a graphic of the promotional coupon for the discounted item. The communication unit has a user control to allow the user to select the displayed coupon, if desired. The communication unit also has a transmission circuit to allow the event of the coupon selection to be communicated at checkout. In this manner, when the item selected is added to the checkout list of items purchased, the amount of the discount for the coupon item is then deducted from the purchase total.

In the preferred embodiment, the communication unit electronically communicates to the checkout register automatically. This is accomplished by a coupon interface module mounted in each checkout stand that alerts the communication unit used by the shopper in selecting coupons to identify the coupons selected and hence the items to be discounted. The communication unit transmits a digital data signal to the interface module identifying the coupons accepted by the purchaser for redemption. The coupon interface module is electronically connected to the checkout register, and when the purchased item is identified and entered, the discount is automatically deducted from the amount of the item entered, as a deducted amount immediately below the amount of the listed item, or, as a deduction from the total, depending on the desire of the store manager or the capability of the checkout register.

In a modern supermarket, items are generally scanned by a product scanner connected to an electronic checkout terminal which detects a bar code that generally identifies the item purchased. The terminal automatically provides the product name and item price for printout on the checkout list or receipt provided to the customer. The terminal is connected to a store computer which provides a central location for accessed product data for the many checkout terminals in the store. The checkout terminals also communicate the data generated at the terminals to the store computer to allow for central accounting and inventory control. The discounted items are appropriately tagged to permit the store manager to track the coupons redeemed and correlate to the coupons redeemed with items purchased.

Since it is desirable to manage the paperless electronic coupon system independently of the store computer, a separate systems controller is employed. This controller is essentially a computer that communicates with the coupon interface modules to extract the information from the data stream between the checkout terminals and the store computer, and coordinates the action of the interface module in injecting discount data to the terminal and store computer during checkout.

In the preferred embodiment, the communication units are primarily portable and communicate with the coupon interface modules via wireless data transmissions. Furthermore, the discount coupons are preferably activated when the shopper is in the market area proximate the location of the discounted items. In this situation, a local message sending unit proximate the location of the item activates the display of the coupon graphic on the display screen of the communication unit carried by the shopper or mounted on the shopper's cart. The shopper is prompted by a screen cue, for example, "select coupon now" and may press a select button on his communication unit to log-in the discount. Since it is the intention that only the shopper who enters the coupon selection received the discount, an incentive is provided to keep an eye on the display screen. This attention attraction incidentally benefits other product promotions displayed on the screen that are available to all without user entry of the selection.

The message sending unit activates the screen display on detecting the communication unit within a defined range and transmits the data signal to the unit by a wireless transmission signal. To monitor and program the variously located message sending units with area specific coupons or other information such as product promotions, advertisements or other data of interest, the system controller communicates with the message sending unit via wireless data transmission. The use of wireless transmission means minimizes the system installation costs and maximizes the mobility of the message sending units for relocation for changes in product promotions. The systems controller is preferably a conventional computer with a keyboard input, a display screen and an outside communications link such as a modem for communication with a regional or national network. In this manner, editing, accounting and monitoring of systems performance can be done locally at the store site, or remotely from a regional or national center where promotionals are solicited and display graphics are created.

The paperless couponing system of this invention can range from a simple display device mounted at the checkout counter that displays coupons to a shopper for selection and redemption at checkout to an elaborate personal in-store communications system in which the user is provided with his own communication device with tools such as product directories, and sales enhancers such as automatically transmitted discount coupons and product promotions. In such a system, both the shopper and store manager benefit.

These and other features are described in the detailed description of the preferred embodiment that follows.

DETAILED DESCRIPTION OF THE PREFERRED EMBODIMENTS

Figure 1:
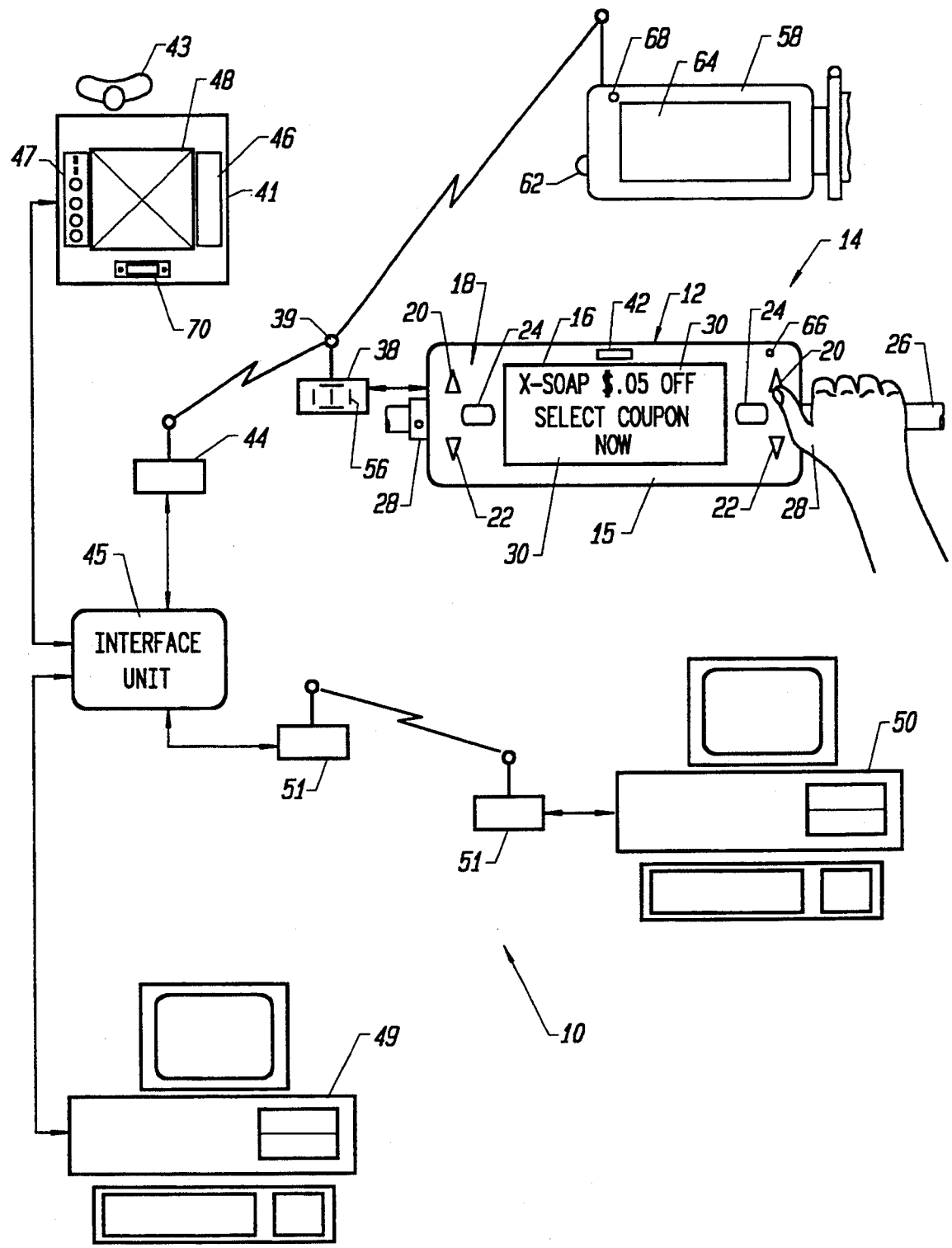
FIG. 1 is a schematic illustration of the electronic paperless couponing system.

Referring to the schematic diagram of FIG. 1, the electronic paperless couponing system is designated generally by the reference numeral 10. The system in its preferred embodiment is incorporated into an electronic display device 12 for customer use in a marketplace such as a modern supermarket or department store. The electronic display device 12 is designed to provide customer assistance through selective display of product directories, and point of purchase promotions, wherein display of product promotions are activated proximate the physical location of the promoted product. This system is described in greater detail in U.S. Pat. No. 4,882,724 of Vela et al, issued 21 Nov. 1989 and in patent application, Ser. No. 08/090,285 of Begum, filed Jul. 12, 1993. However, it is to be understood that the paperless electronic couponing system of this invention can be utilized as a stand-alone system without incorporating the features of the cited references.

The customer display device 12 is part of a portable communication unit 14 having a control panel 15 with a display screen 16 and easily operated user controls 18, such as complementary up and down scroll buttons 20, 22, and select buttons 24. The user controls 18 in the preferred device are located on each side of the display screen 16 and are redundant, that is, allow operations to be performed by either one of the user's thumbs when the unit is mounted on a shopping cart handle 26. The user's hands are customarily positioned on the handle on either side of the display device, and as shown schematically in FIG. 1, provide full access to the set of control buttons 18 on either side of the screen 16 by either one of the user's thumbs, while retaining one of the user's hands on the handle. The other hand can be free to reach for products or do other things usually done in the shopping environment.

The electronic display device 12 may be integrated into the shopping cart handle 26 or attached thereto by an attachment mechanism such as side clamps 28. The use of an attachment mechanism allows the display device 12 to be attached to existing shopping carts in a supermarket without change to the cart. Additionally, the communication unit 14 can be attached to a shopping basket commonly provided by grocery stores, hardware stores and the like.

In one embodiment, the portable communication unit 14 has internal electronic microcircuitry that periodically displays a product coupon 30 in the display screen 16. The product coupon display data that forms the image graphic of the product coupon 30 is retrieved from a coupon data file 32 in the random access storage memory 34 of the unit 14 as diagrammatically illustrated in FIG. 3. After viewing the coupon, the shopper may elect to select the displayed coupon by pressing one of the select buttons 24 on the control panel 15 of the portable communication unit 14, while the coupon is being displayed, or within an additional short period of time after display. The relevant product control data relating to the selected coupon and the related product, such as the coupon identification number, product identification number, bar code number, and savings amount, are then stored in a coupon exception file 36 in the memory 34 of the communication unit 14. The product identification number will customarily correspond to the universal product code (UPC).

The portable communication unit 14 has an internal wireless communicator 38, in the form of an infrared or radio frequency transmitter 39, schematically represented in FIG. 1. When the communication unit 14 is prompted at a checkout counter 41, for example, manually by the checkout person 43 manipulating a reset switch 42 on the communication unit 14, the coupon exception file 36 is transmitted by the transmitter 39 to a receiver 44 in an electronic coupon interface unit 45 at the checkout counter, and the file in the communication unit 14 is cleared for reuse.

At the checkout counter 41, a point of sale terminal 46 is connected to a checkout counter bar code scanner 48 and register 47. The point-of-sale terminal is also electronically connected to the electronic coupon interface unit 45. The receiver 44 of the interface unit 45 receives the coupon exception file 36 transmitted from the communication unit 14, and compares the product identification number and/or bar code number of selected coupons with the corresponding numbers of the items being checked at the checkout counter through the checkout terminal 46. This procedure in the preferred embodiment occurs automatically upon scanning by the product scanner as monitored by the interface unit 45. When purchased items are matched with coupon selections, the register automatically deducts the coupon savings from the checked item and relays the coupon's product control data, along with additional selected data, including cash register terminal number, store identification, time and date of purchase, into a coupon redemption file in a main store computer 49 that is electronically connected to each of the checkout counter terminals. This data is also transmitted via the coupon interface unit 45 via transceivers 51 to a systems controller 50 that operates the electronic couponing system.

The systems controller 50 communicates periodically with a coupon redemption center computer (not shown) for coupon crediting and accounting via radio or microwave transmitter, or by use of a low cost telephone modem. Alternately, each manufacturer or distributor of a purchase item subject to a coupon deduction can poll the store computer 49 or systems controller 50 to selectively extract the crediting and accounting data for its redeemed coupons.

In an alternate embodiment, the portable communication unit 14 has a wireless communicator 38 that is a transceiver to both receive as well as transmit data. The transceiver 56 allows the portable communication unit 14 to be loaded with coupon data remotely. This is important in a market setting where coupons may be discontinued while shopping carts and baskets are in use. Naturally, coupons selected before discontinuance would be honored at the checkout counter. The product control data recorded in the coupon exceptions file is not affected by deletion of the coupon display data or the control data associated with the coupon display data. The data in the exceptions file identifying the shopper's selected coupon discounts is saved until the exception file is cleared and reset at the checkout counter.

Figure 2:
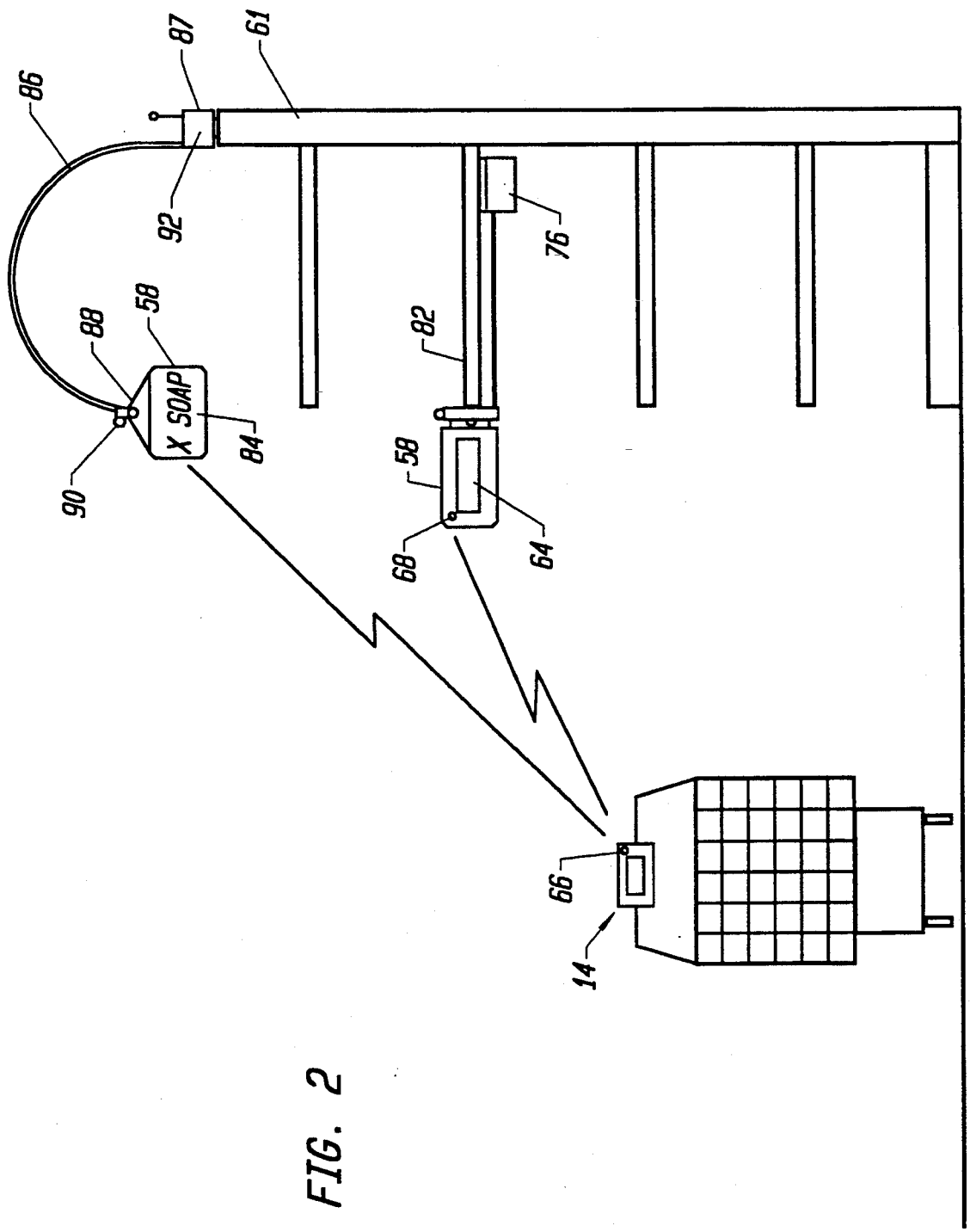
FIG. 2 is a schematic illustration of the system of FIG. 1 in a supermarket aisle.

In addition to the remote loading and discontinuance, the use of a transceiver enables the display of coupons to be generated proximate the store location of the item that is the subject of the coupon. This point of purchase display of the subject coupon can be accomplished by the use of a stationary message sending unit 58 that is located on or proximate the display gondola 61 for the item as shown in FIG. 2. Each message sending unit 58 is locationally identified and loaded with locationally specific data by the storewide systems controller 50 that remotely transmits storewide transmission signals. In this embodiment, the product control data accompanying the coupon display data includes the identity, hence location, of the transmitting message sending unit 58. This locational data can be recorded into the coupon exception files for download at the checkout counter whether or not coupons have been selected. In this manner, the shopper can be tracked from station to station to allow development of additional marketing information.

In operation, the portable communication unit 14 transmits a periodic low level signal, which is detected at a threshold level by the pre-programmed message sending unit 58. Alternately, to conserve power on the portable unit 14, which is minimized in size and therefore has a small battery pack, the message sending unit 58 has a motion detector 62 to detect the presence of a communication unit 14 and transmit a wake-up call, as a cart is rolled by, or a shopper walks by the message sending unit 58. The wake-up transmission activates any communication units 14 within range of the message sending and transmits a digital data signal incorporating the locationally specific product coupon data and product control data to the communication unit 14.

The stationary message sending unit 58 is similar in design to the portable communication unit 14 and at certain locations includes a display screen 64 for simultaneous display of the coupon. Together with a small cue light 66 on the control panel 18 of the communication unit 14 and a cue light 68 on the display screen 64 of the message sending unit, the visual display by the message sending unit 58 prompts the shopper to refer to his own control panel display and select the coupon if desired. While the display screen 64 on the message sending unit 58 can be omitted, it nevertheless has some advantage in prompting those shoppers without carts or baskets that a coupon is available.

Once at the checkout counter, this shopper can enter a coupon selection by use of an available basket, cart or fixed communicator unit 70 mounted on the checkout counters shown in FIG. 1. The appropriate coupon can be located after scrolling through the coupon data file 32, displayed and selected with the scroll and select buttons for quick access.

As mentioned, in its preferred embodiment, the electronic paperless couponing system is operated in association with a product directory and point of purchase product promotional system as described in the referenced application and patent. As an improvement, to enable selective update of point of purchase promotional advertisements that are associated with a particular one of the store distributed message sending units, the message sending unit transmits the product promotional display data, which is similar in form and content to the product coupon display data, to the communication unit 14. The product promotional display data is received by the communication unit 14, temporarily stored in a buffer 69 -and processed by a central processor 71 in the communicator unit 14 to prompt display of the promotional screen display. The screen display is generated directly from formatted screen display data from the processed transmission signal, or, indirectly, after comparison with product promotional display data stored in a promotional data file 73 in the random access storage memory 34 of the communicator unit 14, as a retrieved and processed memory file. The processor 71 preferably includes programmed instructions to display the first formatted screen display data ready for relay to the graphics controller 72 of the display screen 16 only after a file comparison to validate the screen display data as current. This will insure that the promotional screen display is the updated version and is displayed as rapidly as possible.

When the compared data for screen display indicate the stored data file is outdated, the stored file is deleted and the new screen display data of the processed transmission signal is stored in the promotional data file 73 in memory in its stead. Concurrently, any promotional control data accompanying the promotional screen display data is updated, replaced or deleted.

Alternately, the central processor 71 of the communication unit 14 includes programmed instructions to set as a preference the display of the processed transmission signal, unless garbled or otherwise incomplete, where default reliance on the stored data file is then prompted. Again, comparison of the transmitted screen display data and associated control data with the stored screen data and associated control data in the promotional data file 73 is performed by the processor 71 to insure storage of the most recent data, except, of course, where the promotion is terminated and the associated data deleted.

Screen displays retrieved from the stored promotional display file 73 and coupon data file 32 can also be periodically and automatically displayed on the display screen elsewhere in the shopping area, by programmed instructions of the processor 68 to retrieve the display files from memory and display the files to screen on timed intervals. In general, the store manager receives compensation according to frequency of display of a coupon or promotional, and a tailored program is generated by the store manager to control the timing and frequency of select coupons and promotions. Additionally, the shoppers, by use of the thumb controls 18 on the control panel 15 can select from a screen menu file 74, and access the coupon file 32 or promotional file 73 in memory 34 and scroll through the files to review the screen displays of available electronic coupons or promotional items.

Referring to FIG. 2, the message sending unit 58 may be constructed with the control circuitry and battery pack 76 displaced from the front display area of a product gondola 61, as shown, to minimize the occupation of valuable shelf space. The display screen 64 of the message sending unit 58 may be cantilevered from a shelf 82, as shown, or alternatively mounted against the edge of the shelf, (not shown) to maximize exposure and minimize shelf space usage. The message sending unit 58 has the motion detector 62 positioned to sense motion within a limited local field such that only the communication unit or units proximate the unit 58 are awakened, as previously noted. Alternately, as noted, the communication unit 14 sends out a periodic wake-up pulse that is received by the message sending unit 58 to awaken the unit 58 to then send the graphic and accompanying product control data. A blinking cue light 68 signals that this is a promotional or couponing station, and the shopper should pay special attention to the screen 16 of his communication unit 14.

The message sending unit 58 has a high powered spread spectrum radio receiver to receive data from the store's central systems controller 50 equipped with a high-power spread-spectrum transmitter. In this manner, all message sending units in a market place can be programmed from a central location regardless of the location of individual message sending units throughout the store.

Figure 3:
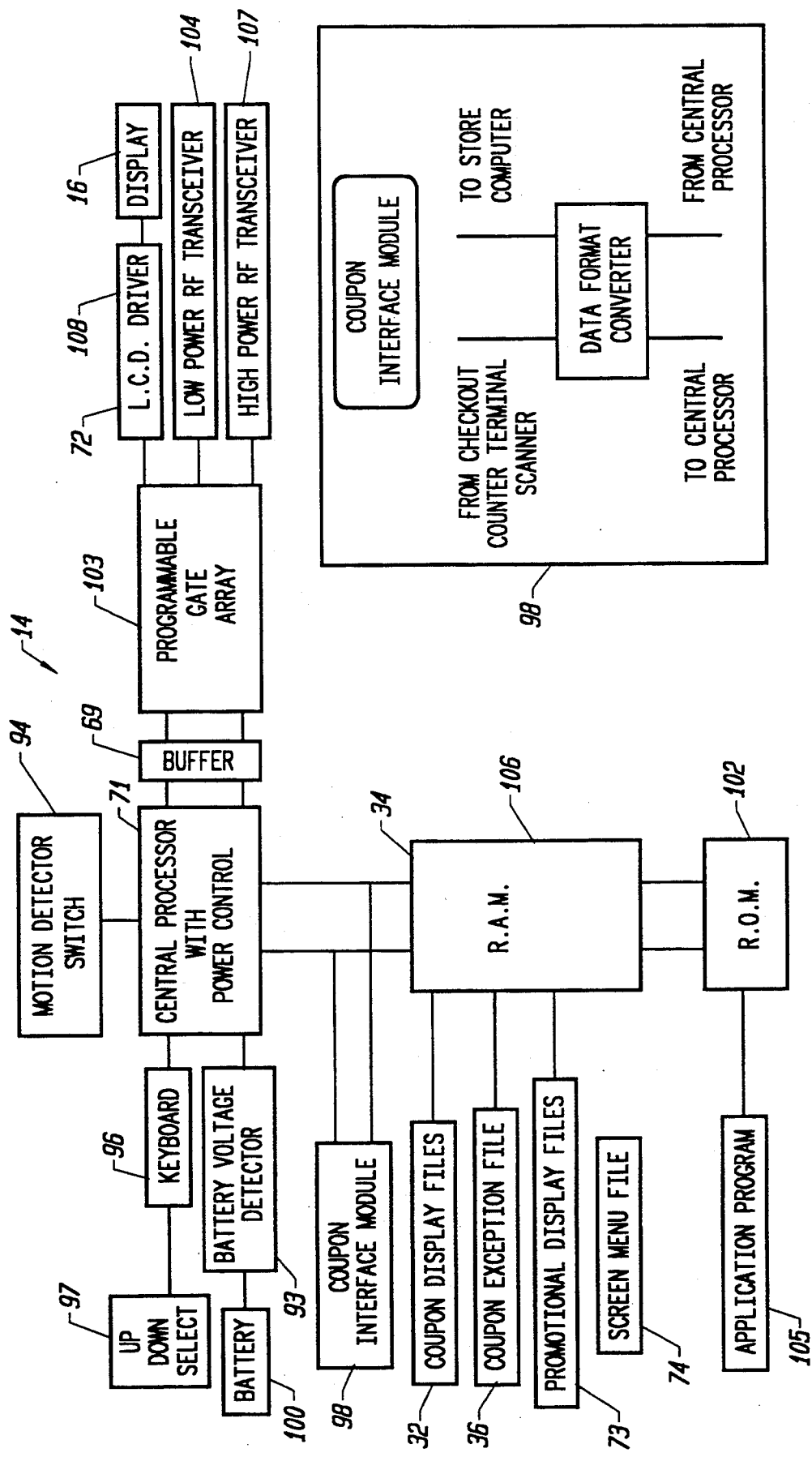
FIG. 3 is a diagrammatic illustration of certain electronic components of the system of claim 1.

The low power, local transceiver 38 in the communications unit 14, however, has a short range designed to communicate with local communication units such as the message sending unit 58 for wake-up and the coupon interface unit 45 at checkout. As shown in FIG. 3, the display screen 64 for the message sending unit can be replaced with a simple sign 84 shown mounted on the end of a wand 86 connected to the control circuitry and battery pack 87 located on the top of the gondola 61. The curved wand 86 has a cue light 88 and motion detector 90 where the feature sign 84 is mounted. In this configuration, the antenna of a low power transceiver 92 is incorporated into the wand.

Referring to the block diagram of FIG. 3, the internal operation of the system can be better understood. A common platform is used for each communication unit 14 and each message sending unit 58 typified in FIGS. 1 and 2.

A central processor 71 manages the tasks with a Motorola M68HC11 to provide the necessary communication capabilities at a reasonable cost. The central processor 71 electronically communicates with a power supply circuit 93 with a battery pack 100 and with a motion detector interface 94 in the case of the message sending unit 58, and, with a keyboard 96 for interfacing the control button subcircuit 97 in the case of the communication unit 14. As electronic coupon interface module 98 also shown in enlarged detail in FIG. 3 provides the chip set and specialty application programming necessary to adapt to the bar code scanner and checkout terminal at the checkout counter, and communicates with the store computer and systems controller. The central processor 71 utilizes a static 256K RAM 100 for random access memory 106 and a 64K EPROM for read only memory 102 under operation of an application program 105.

The central processor 71 also drives an Actel FPGA 2400 gates chip 103 for data flow from the low power transceiver 104, the high power transceiver 107 and the LCD controller 108 which drives the display screen.

In operation, the communication unit 14 provides the shopper with a tool having easy to operate controls for locating items from a directory or reviewing promotions and coupons stored in memory. The promotional system also provides an advantage to the store manager to provide promotional items and coupon items to a shopper for voluntary review or for automatic display either periodically or at a particular location where the promoted item or coupon item is located.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An electronic paperless couponing system for shoppers for use in a store having a purchase item checkout means comprising:
    an electronic communication device having a display screen for display of a graphic of a redemption coupon, the coupon graphic communicating a discount for a product item offered for purchase by the store;
    display screen control means for generating and displaying the coupon graphic in the display screen;
    user control means on the communication device for electively selecting the coupon graphic displayed, thereby indicating the shopper's intent to receive the discount represented by the redemption coupon;

memory means in the communication device to record the user selection and acceptance of the coupon discount on the product item;

communication means in the communication device wherein the communication means communicates the recorded selection of the coupon to the purchase item checkout means, wherein the purchase item checkout means includes a checkout register means for deducting the discount from the product item that is the subject of the redemption coupon when the coupon graphic for that product item has been electively selected and the product is purchased by the shopper, and, not deducting the discount from the product item that is the subject of the redemption coupon when the product is purchased by the shopper and the coupon graphic has not been selected.

2. The electronic paperless couponing system of claim 1 wherein the purchase item checkout means includes a checkout person and the checkout register means comprises a cash register, wherein the checkout person enters the discount in the cash register.

3. The electronic paperless couponing system of claim 1 wherein the checkout means is a store terminal and the communications means includes a data output electronically connected to the store terminal wherein the discount is automatically deducted from the product item when calculating purchased items.

4. The electronic paperless couponing system of claim 1 wherein the checkout means is a store terminal and the data output of the communication means includes a transmitter, and the communication means includes a receiver electronically connected to the store terminal wherein the communication of the communication means with the store terminal is by a wireless data transfer signal through the data output of the communication means.

5. The electronic paperless couponing system of claim 4 wherein the communication means communicates with the store terminal by digitized data through the wireless data transfer signal.

6. The electronic paperless couponing system of claim 5 wherein the digitized data includes data identifying the product item for which product discount is discounted by the store terminal.

7. The electronic paperless couponing system of claim 6 wherein the digitized data includes an amount of the product discount.

8. The electronic paperless couponing system of claim 7 wherein the digitized data includes a product identification number associated with the product item subject to a discount.

9. The electronic paperless couponing system of claim 4 wherein the store terminal includes an electronically connected scanner that recognizes a product item bar code, the product item subject to a discount includes a bar code, and the communication means communicates with the store terminal by digitized data through the wireless data transfer signal, wherein the digitized data includes a bar code identification number of the bar code for the product item subject to the discount.

10. The electronic paperless couponing system of claim 1 wherein the electronic communication device has query controls and the memory means includes a plurality of graphics of different redemptions coupons, wherein the shopper can sequentially display the plurality of graphics of redemption coupons and wherein each selection of a redemption coupon indicating acceptance of the coupon discount for the product item associated with a particular redemption coupon is recorded in the memory means.

11. The electronic paperless couponing system of claim 1 wherein the store has a plurality of transmitter means for transmitting a graphic of a redemption coupon by a wireless data signal and the electronic communication device includes a receiver means for receiving the transmitted graphic of a redemption coupon and automatically displaying the coupon graphic on the display screen without action by the shopper.

* * * * *